United States Patent
Higashi et al.

(10) Patent No.: US 7,481,891 B2
(45) Date of Patent: Jan. 27, 2009

(54) CIGARETTE WRAPPER CONSISTING OF MANDARIN ORANGE ESSENTIAL OIL

(75) Inventors: Nobukazu Higashi, Yokohama (JP); Fumihiro Omori, Yokohama (JP); Tomoko Monobe, Yokohama (JP); Jun Komiya, Yokohama (JP); Satomi Kunieda, Yokohama (JP); Makoto Emura, Ninomiya-machi (JP); Yoichiro Nishizawa, Yokohama (JP); Takeshi Ishizuka, Tokyo (JP); Takahiro Ariyoshi, Chigasaki (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 10/429,731

(22) Filed: May 6, 2003

(65) Prior Publication Data
US 2003/0192562 A1    Oct. 16, 2003

Related U.S. Application Data

(63) Continuation of application No. PCT/JP01/09605, filed on Nov. 1, 2001.

(30) Foreign Application Priority Data

Nov. 6, 2000  (JP)  ............................ 2000-338126
Nov. 6, 2000  (JP)  ............................ 2000-338128
Nov. 6, 2000  (JP)  ............................ 2000-338130

(51) Int. Cl.
*A24D 1/10*  (2006.01)
(52) U.S. Cl. ...................................... 131/274; 131/365
(58) Field of Classification Search ................ 131/364, 131/365, 274, 275
See application file for complete search history.

(56) References Cited

U.S. PATENT DOCUMENTS 3,006,347  A  *  10/1961  Keaton ........................ 131/277
3,258,015  A  *  6/1966  Ellis et al. ..................... 131/273
3,887,603  A  *  6/1975  Rundberg et al. ............ 558/265
3,890,981  A  *  6/1975  Vinals et al. ................. 131/277
3,970,701  A      7/1976  Sanderson et al.
4,271,076  A      6/1981  Becker et al.
4,391,284  A      7/1983  Sprecker et al.
4,669,490  A  *  6/1987  Naegeli et al. .............. 131/276
5,144,964  A  *  9/1992  Demain ....................... 131/275

FOREIGN PATENT DOCUMENTS

| EP | 0 503 795 A2 | 9/1992 |
| EP | 0503795 * | 9/1992 |
| EP | 0531221 A1 | 3/1993 |
| EP | 0694514 A2 | 1/1996 |
| FR | 1 358 115 A | 4/1964 |
| FR | 2 338 240 A | 8/1977 |
| GB | 1 469 135 A | 3/1977 |
| GB | 1 591 342 | 6/1981 |
| JP | 57-102995 U | 6/1982 |
| JP | 59-45866 A | 3/1984 |
| JP | 62-12735 A | 1/1987 |
| JP | 62-96078 A | 5/1987 |
| JP | 9-103473 A | 4/1997 |
| JP | 2000-96493 * | 4/2000 |
| WO | WO-00/49120 A1 | 8/2000 |

OTHER PUBLICATIONS

"Gas Extraction of Citrus Flavor from Aqueous and Non-Aqueous Solutions", Andreas Bezold et al, http://www.tu-harburg.de/vt2/German/Gruppe_Brunner/Zetzl/CitrusEng.htm (Last Updated: Jun. 06, 1998).*
Known-Customary Technologies (Perfume), Part I, Perfume in General, Published Jan. 2, 1999.
"Chinese Encyclopedia of Agriculture" Agriculture Press, Beijing, 1993-5, the Fruit Tree Volume. Partial English translation also provided.

* cited by examiner

*Primary Examiner*—Carlos Lopez
(74) *Attorney, Agent, or Firm*—Birch, Stewart, Kolasch & Birch, LLP

(57) ABSTRACT

A tobacco odor deodorizing perfume composition contains a mandarin orange essential oil or a mandarin orange essential oil fraction having its terpene hydrocarbons substantially removed therefrom.

4 Claims, No Drawings

CIGARETTE WRAPPER CONSISTING OF MANDARIN ORANGE ESSENTIAL OIL

CROSS-REFERENCE TO RELATED APPLICATIONS

This is a Continuation Application of PCT Application No. PCT/JP01/09605, filed Nov. 1, 2001, which was not published under PCT Article 21(2) in English.

This application is based upon and claims the benefit of priority from the prior Japanese Patent Applications No. 2000-338126, filed Nov. 6, 2000; No. 2000-338128, filed Nov. 6, 2000; and No. 2000-338130, filed Nov. 6, 2000, the entire contents of all of which are incorporated herein by reference.

BACKGROUND OF THE INVENTION

1. Field of the Invention

The present invention relates to a tobacco odor deodorizing perfume composition, a tobacco odor deodorizer, a cigarette low in sidestream smoke odor, and a tobacco package.

2. Description of the Related Art

In general, tobacco odor such as sidestream smoke released from a tobacco smoking article such as a cigarette is not desirable to, particularly, the nonsmoker. Particularly, it is a matter of serious concern to suppress the odor of the sidestream smoke released to the surroundings during the smoking.

One of the measures for suppressing the odor of the tobacco sidestream is to deodorize the tobacco sidestream smoke released during the smoking from the tobacco smoking article to the surroundings, such as within a room. In general, in order to deodorize the malodor released to the surroundings, a method is employed in which a substance producing a very strong aroma is used as a deodorant, whose strong aroma is mixed with the malodor to shield the malodor (see "Known-Customary Technologies (Perfume), Part I, Perfume In General, Published on Jan. 29, 1999").

However, in the conventional deodorant, used is a perfume having an intensity higher than that of the smell, with the result that the intensity of the odor after the mixing of the perfume is considerably higher than that before the mixing, resulting in production of an unpleasant feel in many cases. Also, even if it is possible to shield the smell felt before the mixing with the perfume, the odor after the mixing newly produces in many cases another unpleasant feel. It follows that the conventional deodorant fails to basically improve the unpleasantness of the odor.

Another measure for suppressing the odor of the tobacco sidestream smoke is to add a perfume for masking the odor of the sidestream smoke to the tobacco smoking article so as to prevent the odor of the sidestream smoke from being released from the tobacco smoking article itself. For example, in order to improve the odor of the tobacco sidestream smoke released to the surroundings during the static burn of a cigarette, it is proposed to add a perfume for masking the unpleasant odor to the wrapper paper sheet of the cigarette.

However, it has been found that the conventional perfume for masking the odor of the sidestream smoke, which certainly lowers the odor of the tobacco sidestream smoke, also lowers the tobacco aroma tasted as the tobacco mainstream smoke. It has also been found that the fragrance of the perfume itself is produced relatively strongly, with the result that the intensity of the overall odor generated during the static burn of a cigarette is increased.

Under the circumstances, an object of the present invention is to provide a tobacco odor deodorizing composition and a tobacco odor deodorant, which permits masking the tobacco odor without increasing the overall odor after the mixing with the odor of the sidestream smoke released to the surroundings during the smoking to an unpleasant level and without newly producing another unpleasant odor after the mixing with the odor of the sidestream smoke.

Another object of the present invention is to provide a cigarette which permits preventing the intensity of the overall odor generated during the static burn of the cigarette from being significantly increased and which also permits suppressing the odor of the sidestream smoke.

BRIEF SUMMARY OF THE INVENTION

As a result of extensive research conducted in an attempt to achieve the objects described above, the present inventors have discovered that a mandarin essential oil or a mandarin orange essential oil fraction having its terpene hydrocarbons substantially removed therefrom is capable of effectively masking the tobacco odor without significantly increasing the intensity of the overall odor even when mixed with the tobacco odor. It has also been found that the mandarin orange essential oil or the mandarin orange essential oil fraction having the terpene hydrocarbons substantially removed therefrom is capable of suppressing the odor of the sidestream smoke generated from the cigarette itself without significantly increasing the intensity of the overall odor generated during the static burn of the cigarette. The present invention has been achieved on the basis of these findings.

Thus, according to a first aspect of the present invention, there is provided a tobacco odor deodorizing perfume composition comprising a mandarin orange essential oil or a mandarin orange essential oil fraction having its terpene hydrocarbons substantially removed therefrom.

According to a second aspect of the present invention, there is provided a tobacco odor deodorant comprising a tobacco odor deodorizing composition containing a mandarin orange essential oil or a mandarin orange essential oil fraction having its terpene hydrocarbons substantially removed therefrom, and a carrier carrying the tobacco odor deodorizing composition.

According to a third aspect of the present invention, there is provided a cigarette comprising a tobacco rod including a tobacco filler material and a cigarette wrapper paper sheet wrapping the outer circumferential surface of the tobacco filler material, and carries a sidestream smoke odor reducing agent comprising a mandarin orange essential oil or a mandarin orange essential oil fraction having it terpene hydrocarbons substantially removed therefrom.

Further, according to a further aspect of the present invention, there is provided a tobacco package packing tobacco rods including a tobacco filler material and a cigarette wrapper paper sheet wrapping an outer circumferential surface of the tobacco filler material, and containing a sidestream smoke odor reducing agent comprising a mandarin orange essential oil or a mandarin orange essential oil fraction having it terpene hydrocarbons substantially removed therefrom.

The perfume composition of the present invention belongs to the category of the refined or dispensed perfume that is obtained from the natural perfume by means of refining or dispensing and is distinguished from the formulated perfume.

DETAILED DESCRIPTION OF THE INVENTION

The present invention will now be described in detail.

The tobacco odor deodorizing perfume composition of the present invention comprises a mandarin orange essential oil or a mandarin orange essential oil fraction having its terpene hydrocarbons removed therefrom.

The mandarin orange essential oil used in the present invention, which is hereinafter referred to as "MOO" in some cases, represents an essential oil obtained by expressing the fruit of mandarin (Citrus reticulate Blancao) belonging to Rutaceae at cold or at room temperature, which is generally called a cold press oil. MOO can be manufactured by ordinary methods and is also commercially available.

MOO contains terpene hydrocarbons such as limonene, terpinene, terpinolene, myrcene, caryophyllene, sabinene, cymene, pinene, and farnecene; alcohols such as linalool, terpineol, heptanol, octanol, carveol, thymol, menthane dienol, and perillalcohol; aldehydes such as octanal, nonanal, decanal, sinensal, geranial, and citronellal; ketones such as carvone; acids such as citronella acid; and methyl anthranilate, methyl N-methylanthranilate, and limonene oxide.

The mandarin orange essential oil fraction having its terpene hydrocarbons substantially removed therefrom, which is hereinafter referred to as "terpene-removed MOO fraction" in some cases, can be obtained by subjecting MOO to a silica gel column fractionation. To be more specific, MOO is loaded in a silica gel column and developed with a hydrocarbon such as a petroleum ether, hexane, heptane, benzene, toluene or cyclohexane so as to remove the eluting fraction. This eluting hydrocarbon fraction contains terpene hydrocarbons. Then, when the silica gel column is developed with a polar solvent such as methyl acetate, ethyl acetate, propyl acetate, butyl acetate or acetone, the fraction containing the oxygen-containing components is eluted. The oxygen-containing fraction, which contains alcohols, aldehydes, ketones, esters, acids, etc., can be used in the present invention as the terpene-removed MOO fraction.

It is possible to carry out a reduced pressure distillation prior to the silica gel fractionation so as to remove the component having a high melting point as the distillation residue.

It is also possible to substantially remove the terpene hydrocarbons by means of distillation. For example, it is possible to provide the distillation residue obtained by removing the fraction, which distills at temperatures up to about 43° C. when MOO is subject to distillation under a reduced pressure of about 300 Pa, as the terpene-removed MOO fraction. It is also possible to subject the distillation residue further to a precision distillation and to provide the resultant fraction as the terpene-removed MOO fraction used in the present invention.

It is possible to provide MOO or the terpene-removed MOO fraction, which constitutes the tobacco odor deodorizing composition of the present invention, in the form that the acid components are substantially removed. For example, an alkaline aqueous solution such as sodium hydroxide or potassium hydroxide is mixed with MOO or the terpene-removed MOO fraction before or after the silica gel fractionation or the distilled fractionation referred to above, and the mixture is sufficiently stirred. When the stirred mixture is left to stand, the mixture separates into an oil layer and a water layer. The oil layer, which is obtained by removing the water layer, is substantially free from the acid components.

Even if the perfume of the tobacco odor deodorizing composition of the present invention is mixed with the tobacco odor, the composition permits effectively deodorizing the tobacco odor without significantly increasing the intensity of the overall odor after the mixing.

It is possible to house the tobacco odor deodorizing perfume composition of the present invention in a suitable container and to dispose the container as a tobacco deodorant within a room.

However, it is possible for the tobacco odor deodorizing perfume composition of the present invention to be carried by a suitable carrier so as to provide a tobacco odor deodorant.

In this case, it is possible to add further perfume componenst generally used as a component producing a deodorizing effect to the tobacco odor deodorizing composition of the present invention. The deodorizing perfumes used in the present invention include, for example, various synthetic perfumes, natural perfumes, synthetic essential oils, natural essential oils and a citrus oil. To be more specific, it is possible to use a wide range of deodorizing perfumes described in, for example, "Known Customary Technologies (Perfume), Part I, Perfumes in general, 2·6·16 Masking Agent pp 230 to 250 (1999)".

The forms of the tobacco odor deodorant of the present invention includes a liquid, a solid, a powder, a gel, a mist, or an aerosol.

On the other hand, the carrier may be a liquid base material, a solid base material, a powdery base material, a gel base material, a mist base material or an aerosol base material as the carrier in accordance with the selected form of deodorant.

In the present invention, the methods whereby the deodorizing composition is carried by the carrier include, in the case of a liquid base material, a gel base material or a mist base material, using, for example, a surfactant, a gelling agent or a water-soluble high molecular weight material as the carrier, and allowing the deodorizing composition to be carried within the micell or gel formed by the carrier. On the other hand, in the case of a solid base material, a powdery base material or an aerosol base material, the deodorizing composition may be carried on the surface of the powdery or granular formed material such as silica gel.

The liquid base material used in the present invention includes, for example, nonionic surfactants such as polyoxyethylene sorbitan mono-oleate, polyoxyethylene sorbitan monostearate, and polyoxyethylene cured castor oil; and anionic surfactants such as polyoxy lauryl ether sodium phosphate.

The gel base materials include those formed from, for example, gel materials extracted from various plants, animals, algae, and microorganisms such as carrageenan, juran gum, tragacanth, agar-agar, gelatin, and pectin; metal soaps used as gel materials such as sodium stearate and sodium 12-hydroxystearate; and water-soluble organic high molecular weight materials such as polyvinyl alcohol, a cellulose derivative, and a starch derivative.

The solid base materials include, for example, powdery or granular formed materials such as silica gel, alumina, zeolite, diatomaceous earth, calcium silicate, pulp, and cellulose.

The mist base materials include, for example, nonionic surfactants such as polyoxyethylene sorbitan monooleate, polyoxyethylene sorbitan monostearate, and polyoxyethylene cured castor oil; and anionic surfactants such as sodium polyoxylauryletherphosphate.

Further, the aerosol base materials used in the present invention include, for example, spherical formed materials such as a spherical silica gel.

In the present invention, the amount of the tobacco odor deodorant such as the liquid deodorant, the solid deodorant, the powdery deodorant, the gel deodorant, the mist deodorant or the aerosol deodorant is controlled optionally in accordance with the expected effect and function of the deodorant. However, it is generally desirable for the deodorant to contain about 0.005 to 50 mass % of the tobacco odor deodorizing composition.

In putting the tobacco odor deodorant of the present invention to practical use, it is possible to add the deodorant to the perfumes and cosmetics, the foods, the external remedies, the compositions for the oral cavity, or the sanitary materials.

The perfumes and cosmetics include, for example, an emollient lotion, an astringent lotion, a wiping lotion, a milk lotion, a body lotion, an after-shave lotion, a massage cream, a cleansing cream or gel, an antiperspirant, an eye pack agent, shampoos, hair creams, hair tonics, pomades, rinses, conditioners, hair-growing lotions and other cosmetic base materials for the hair; toilet powders, a lipstick, and other cosmetic base materials and detergents for cosmetics.

The foods include, for example, drinking beverage such as a fruit juice beverage, fruit liquors, a milk, a carbonic beverage, and drinks; cold confectionery such as ice creams, sherbets, and ice candies; favorite foods and drinks such as Japanese and Western confectionery, jams, candies, jellies, gums, breads, coffees, cocoas, black teas, oolong teas, and green teas; soups such as Japanese style soup, Western style soup, and Chinese style soup; flavors, seasonings, various pre-cooked drinks and foods, and various snack foods.

The external remedies include, for example, an aerosol preparation, a cataplasm agent, an ointment, and a bathing agent.

The oral compositions includes, for example, a dentifrice, an oral detergent, a mouth wash, and a chewing gum.

Further, the sanitary materials include, for example, washing detergents, detergent for disinfection, detergents for odor prevention, indoor fragrance producing agents, indoor deodorants, soaps, detergents for washing dishes, softeners, furniture cares, and other sanitary detergents; various sanitary materials such as tissue paper, and toilet paper; and sanitary medicines such as a flavor imparting agent for facilitating the dosage of a medicine.

It suffices for the tobacco odor deodorant of the present invention to contain as indispensable ingredients a mandarin orange oil, a mandarin essential oil fraction having terpene hydrocarbons removed therefrom, and a carrier for carrying the mandarin orange oil or the mandarin essential oil. Where the deodorant of the present invention is applied to perfumes, cosmetics, foods, external remedies, oral compositions, or sanitary materials, it is possible to apply the deodorant directly or in the form of a solution having the deodorant dissolved in, for example, alcohols, or polyhydric alcohols such as propylene glycol, or glycerin; in the form of an emulsion emulsified by using an emulsifying agent such as natural rubbery materials including gum arabic and tragacanth, glycerin fatty acid ester, or a sucrose fatty acid ester; in the form of a powder prepared by using an excipient such as natural gum substance including gum arabic, gelatin, or dextrin; in the form of a soluble or dispersible material that is made soluble or dispersible by using a surfactant such as a nonionic surfactant, an anionic surfactant, a cationic surfactant or an amphoteric surfactant; or in the form of a microcapsule prepared by the processing with an encapsulizing agent. The form of the deodorant can be selected appropriately in accordance with the object of applying the deodorant.

Further, it is possible to have the tobacco odor deodorant of the present invention included in an inclusion agent such as cyclodextrin so as to stabilize and to release gradually the deodorant. These are selected for use appropriately in a manner to be adapted for the form of the final product of the deodorant such as a liquid form, a solid form, a powdery form, a gel form, a mist form or an aerosol form.

Also, the tobacco odor deodorant of the present invention is used in some cases in combination with other deodorants such as a perfume, an oxidizing agent, a reducing agent, a neutralizing agent, an inorganic deodorant such as an inorganic base, an inorganic acid, a metal oxide, a chlorine compound, ozone, and a porous material, and surfactants such as a nonionic surfactant, an anionic surfactant, a cationic surfactant and amphoteric surfactant.

Incidentally, the addition amount of the tobacco odor deodorant to the final products such as the perfumes and cosmetics, the foods, the external remedies, the oral composition, and the sanitary material can be determined optionally in accordance with the expected effect and function, though about 0.0005 to 20 mass % of the tobacco odor deodorant is added in general based on the total mass of the final product.

Further, MOO or the terpene-removed MOO fraction used in the present invention can provide a tobacco sidestream smoke odor reducing agent for reducing the tobacco sidestream smoke odor generated from the cigarette itself.

The sidestream smoke odor reducing agent of the present invention, which contains MOO or the terpene-removed MOO fraction, is carried by a cigarette. The cigarette comprises a tobacco rod including a tobacco filler material and a cigarette wrapper paper sheet wrapping the outer circumferential surface of the tobacco filler material. The tobacco filler material includes tobacco shreds. The tobacco shreds may be expanded. It is possible to employ a known expanding method for expanding the tobacco shreds. Also, it is possible to use any wrapper paper sheet suitable for wrapping the outer circumferential surface of the tobacco filler material so as to provide a cigarette. Incidentally, the cigarette of the present invention may be provided with a filter plug at one end of the tobacco rod.

The sidestream smoke odor reducing agent of the present invention can be carried by the cigarette in various forms. For example, the sidestream smoke odor reducing agent of the present invention can be carried by the cigarette by adding the odor reducing agent to the tobacco filler material, by coating the cigarette wrapper paper sheet with the odor reducing agent, or by adding the odor reducing agent to a seam paste for bonding the cigarette wrapper paper sheet. The effect of reducing the sidestream smoke odor is not particularly dependent on the application positions such as the tobacco shreds. However, it is possible to add the sidestream smoke odor reducing agent of the present invention to the tobacco filler material by the ordinary technology of imparting flavor to the tobacco shreds. Naturally, the particular addition method is convenient. In any case, it is desirable for the sidestream smoke odor reducing agent of the present invention to be applied uniformly. Incidentally, where the cigarette of the present invention has a filter plug at one end of the tobacco rod, the filter plug is connected in general to the tobacco rod by using a so-called tip paper. It is possible to coat the tip paper or a filter wrapper paper sheet with the sidestream smoke odor reducing agent of the present invention.

The sidestream smoke odor reducing agent of the present invention is carried by the cigarette of the present invention such that MOO or the terpene-removed MOO fraction is contained in an amount of preferably at least 0.01 mg/cigarette, more preferably, 0.02 mg to 0.2 mg/cigarette.

Further, the sidestream smoke odor reducing agent of the present invention can be housed in a tobacco package. The tobacco package contains a plurality of cigarettes, e.g., 20 cigarettes, each comprising a tobacco rod including a tobacco filler material and a cigarette wrapper paper sheet wrapping the outer circumferential surface of the tobacco filler material as well as the sidestream smoke odor reducing agent of the present invention. The sidestream smoke odor reducing agent of the present invention can be housed in the tobacco package by, for example, applying it to an aluminum foil. The sidestream smoke odor reducing agent of the present invention housed in the tobacco package is migrated into the cigarette before the tobacco package is opened so as to decrease the sidestream smoke odor in the smoking time.

The present invention will now be described by way of its Examples, which do not limit the present invention, and the present invention is not limited to these Examples.

The apparatuses used for measuring the properties in the Examples are as follows:

Gas chromatograph (GC): HP-6890 (manufactured by Azilent Technology, Inc.);
Column: HP-20 (0.25 mm×25 mm) (manufactured by Azilent Technology, Inc.);
Column temperature: 55-215° C. (4° C./min)

PREPARATION EXAMPLE 1

Preparation of Terpene-Removed MOO Fraction (MOO-1-1) by Silica Gel Fractionation MOO (500 g) was applied to a silica gel column chromatograph prepared by using 550 g of silica gel (Silica gel 60 0.063-0.200 mm manufactured by Merk Inc.). Specifically, after the silica gel was loaded with hexane, MOO was loaded in the silica gel column and developed with 2.2 L of hexane so as to obtain a hydrocarbon fraction (hereinafter referred to as "HC fraction"). Then, the silica gel column was developed with 2.2 L of ethyl acetate so as to obtain an oxygen-containing fraction as the terpene-removed MOO fraction (MOO-1-1). Finally, the silica gel column was developed with 2.2 L of ethanol so as to obtain an ethanol fraction.

The recovered amount of the HC fraction was 336 g (68.0 mass %), the recovered amount of the oxygen-containing fraction (MOO-1-1) was 16.8 g (3.4 mass %), the recovered amount of the ethanol fraction was 0.5 g (0.1 mass %), and the entire recovery rate was 71.5%. The main components of MOO-1-1 thus obtained are as shown in Table 1.

PREPARATION EXAMPLE 2

Preparation of Terpene-Removed MOO Fraction (MOO-2-1) by Distillation and Silica Gel Column Fractionation (1) MOO (4997 g) was supplied to a Claisen distillation apparatus and distilled under a reduced pressure of 400 Pa (3 mmHg) so as to obtain a fraction distilled under temperatures up to 102° C. The distillation residue was further distilled under a reduced pressure of 10.7 Pa (0.08 mmHg) so as to obtain a fraction distilled under temperatures up to 97° C. The distilled fraction thus obtained was combined with the distilled fraction obtained previously. The combined distilled fractions (distilled oil) were 4769 g (95.4 mass %), the amount of the distillation residues were 79 g (1.6 mass %), and the recovery rate was 97.0 mass %.

(2) The distilled oil (504 g), obtained in item (1) above, was applied to a silica gel column chromatograph prepared by using silica gel in an amount of 1 kg, which is substantially twice the mass of the distilled oil. To be more specific, after the silica gel was loaded with hexane, MOO was loaded in the silica gel column and developed with 8 L of hexane so as to obtain an HC fraction. Then, the silica gel column was developed with 8 L of ethyl acetate so as to obtain an oxygen-containing fraction as the terpene-removed MOO fraction (MOO-2-1). Finally, the silica gel column was developed with 4 L of ethanol so as to obtain an ethanol fraction.

The recovered amount of the HC fraction was 445 g (88.1 mass %), the recovered amount of the oxygen-containing fraction (MOO-2-1) was 9.6 g (1.9 mass %), the recovered amount of the ethanol fraction was 0 g (0 mass %), and the entire recovery rate was 90.0%. The main components of MOO-2-1 thus obtained are as shown in Table 1.

PREPARATION EXAMPLE 3

Preparation of Terpene-Removed MOO Fraction (MOO-3-1) by Distillation, Removal of Acid Portion, and Silica Gel Column Fractionation The distilled oil (4 kg), obtained in Preparation Example 2 (1), was slowly added with a 10% aqueous sodium hydroxide solution (1 kg) while stirring the mixture. After a sufficient stirring, the mixture was left to stand so as to separate the mixture into an oil layer and a water layer. Then, the water layer was removed so as to obtain the oil layer. The oil layer thus obtained was washed twice with a saturated aqueous sodium chloride solution (2 L). After subjecting to the separation, the oil layer was dried over anhydrous magnesium sulfate so as to obtain 3.93 kg of MOO having the acid components removed therefrom.

The thus obtained oil (503 g) was applied to a column chromatograph prepared by using silica gel in an amount substantially twice the mass of the obtained oil. To be more specific, after the silica gel was loaded with hexane, the oil was loaded in the column and developed with 8 L of hexane so as to obtain an HC fraction. Then, the column was developed with 8 L of ethyl acetate so as to obtain an oxygen-containing fraction as the terpene-removed MOO fraction (MOO-3-1) having the acid components removed therefrom. Finally, the column was developed with 4 L of ethanol so as to obtain an ethanol fraction.

The recovered amount of the HC fraction was 431 g (84.2 mass %), the recovered amount of the oxygen-containing fraction (MOO-3-1) was 8.7 g (1.7 mass %), the recovered amount of the ethanol fraction was 0.02 g (0.04 mass %), and the entire recovery rate was 85.94%. The main components of MOO-3-1 thus obtained are as shown in Table 1.

TABLE 1

| | Main Components | Component Amount (Mass %) | | |
|---|---|---|---|---|
| | | MOO-1-1 | MOO-2-1 | MOO-3-1 |
| Hydrocarbons | Limonene | 0.1 | 0.2 | 0.1 |
| | γ-terpinene | Trace | 0.2 | Trace |
| Alcohols | Linalool | 13.8 | 15.3 | 16.5 |
| | 4-terpineol | 2.8 | 2.6 | 2.5 |
| | α-terpineol | 5.1 | 4.2 | 4.6 |
| | Octanol | 2.6 | 2.7 | 2.6 |
| | Trans-carveol | 1.9 | 2.0 | 2.2 |
| | Thymol | 1.1 | 1.2 | 0.2 |
| | Heptanol | 0.5 | — | 1.1 |
| | Trans-p-menthane-2,8-diene-1-ol | 1.6 | 2.4 | 2.8 |
| | Cis-carveol | 2.2 | 2.6 | 0.8 |
| Aldehydes | Octanal | 6.6 | 8.8 | 6.8 |
| | Sinensal | 6.0 | 1.5 | 1.7 |
| | Nonanal | 1.4 | 1.5 | 1.4 |

TABLE 1-continued

| | Main Components | Component Amount (Mass %) | | |
|---|---|---|---|---|
| | | MOO-1-1 | MOO-2-1 | MOO-3-1 |
| | Geranial | Trace | 0.7 | 0.4 |
| | Decanal | 3.4 | 3.2 | 3.4 |
| | Citronellal | Trace | — | — |
| Ketones | Carvone | 1.5 | 2.7 | 3.0 |
| Acids | Citronella acid | 3.5 | 2.5 | 1.4 |
| Others | Methyl N-methyl-anthranilate | 22.6 | 22.2 | 22.5 |
| | Trans-limonene oxide | 0.7 | 1.5 | 3.0 |
| | Cis-limonene oxide | 0.5 | 1.3 | 2.0 |
| Total | | 77.9 | 79.3 | 79.0 |

PREPARATION EXAMPLE 4

Preparation of Terpene-Removed MOO Fraction (MOO-1-2) by Distillation

MOO (5,000 g) was supplied to a fractionator. The fraction distilled under a reduced pressure of 300 Pa (2.2 mmHg) at temperatures of up to 43° C. was removed so as to obtain 164 g (3.3 mass %) of the distillation residue as the terpene-removed MOO fraction (MOO-1-2). Table 2 shows the main components of MOO-1-2.

PREPARATION EXAMPLE 5

Preparation of Terpene-Removed MOO Fraction (MOO-2-2) by Distillation

The distilled MOO-1-2 (140 g), obtained in Preparation Example 4, was supplied to a Claisen distillation apparatus for distillation under a reduced pressure of 24 Pa (0.18 mmHg). The fraction distilled at temperatures up to 103° C. was obtained as the terpene-removed MOO fraction (MOO-2-2). The yield was 67 g, which was 47.9 mass % based on MOO-1-2, and 1.6 mass % based on MOO. Table 2 shows the main components of MOO-2-2.

PREPARATION EXAMPLE 6

Preparation of Terpene-Removed MOO Fraction (MOO-3-2) by Distillation and Removal of Acid Portion 80 g of 5% aqueous sodium hydroxide solution was gradually added to the distilled MOO-2-2 (80 g) obtained in Preparation Example 5 while stirring the mixture. After a sufficient stirring, the mixture was left to stand so as to separate the mixture into an oil layer and a water layer. Then, the oil layer was obtained by removing the water layer. The oil layer thus obtained was washed twice with 50 mL of a saturated aqueous sodium chloride solution. After subjecting to the liquid separation, the oil layer was dried over anhydrous magnesium sulfate so as to obtain a terpene-removed MOO fraction (MOO-3-2) having the acid components removed therefrom. The yield was 33.0 g, which was 41.3 mass % based on the distilled MOO-2-2, and 1.3 mass % based on MOO. Table 2 shows the main components of MOO-3-2.

TABLE 2

| | Main Components | Component Amount (Mass %) | | |
|---|---|---|---|---|
| | | MOO-1-2 | MOO-2-2 | MOO-3-2 |
| Hydrocarbons | Limonene | 0.1 | Trace | Trace |
| | γ-terpinene | 0.8 | 0.7 | 0.6 |
| | Terpinolene | 0.4 | 0.3 | 0.3 |
| | Caryophillene | 1.6 | 1.7 | 1.8 |
| | p-cymene | 0.3 | 0.3 | 0.3 |
| | Farnesene | 3.8 | 3.7 | 4.0 |
| Alcohols | Linalool | 14.8 | 14.7 | 15.2 |
| | 4-terpineol | 1.4 | 1.3 | 1.3 |
| | α-terpineol | 4.3 | 4.5 | 4.5 |
| | Octanol | 0.8 | 0.8 | 0.8 |
| | Trans-carveol | 2.1 | 2.1 | 2.2 |
| | Thymol | 1.7 | 1.4 | 0.7 |
| | Trans-p-menthane-2,8-diene-1-ol | 2.7 | 3.0 | 3.2 |
| | Cis-p-menthane-1,8-diene-1-ol | 1.1 | 1.1 | 1.2 |
| | Cis-carveol | 3.8 | 3.3 | 3.5 |
| Aldehydes | Sinensal | 4.7 | 2.0 | 2.1 |
| | Octanal | 6.6 | 8.8 | 6.8 |
| | Nonanal | 0.8 | 0.8 | 0.7 |
| | Decanal | 2.9 | 2.8 | 2.8 |
| | Citronellal | 0.9 | 0.9 | 0.9 |
| | Geranial | 1.1 | 1.2 | 1.2 |
| Ketones | Carvone | 3.9 | 4.2 | 4.5 |
| Acids | Citronella acid | 1.4 | 1.4 | 1.0 |
| Others | Methyl N-methyl-anthranilate | 25.8 | 26.2 | 26.2 |
| | Trans-limonene oxide | 1.9 | 1.8 | 1.9 |
| | Cis-limonene oxide | 2.1 | 2.1 | 2.2 |
| Total | | 91.8 | 91.1 | 89.9 |

<Test for Deodorizing Effect>

The deodorizing effect of MOO and the terpene-removed MOO fractions obtained in Preparation Examples 1 to 6 was evaluated by the organoleptic evaluating method (odor bag method) described below. Incidentally, the deodorizing effect was also evaluated in respect of an ordinary orange essential oil (Comparative Example).

Malodorous Bag Method

Prepared are a parallelepiped chamber (sidestream smoke chamber) having an inner volume of 405 L and equipped, at an upper portion of the inside wall, with an air bag mounting tube communicating with the outer atmosphere, and at a lower portion of the inside wall, with a through-hole for insertion of an inner air suction port, and also having a cigarette mounting tool at the inside wall, as well as an air collecting box available on the market. The air collecting box, which has an inner volume slightly larger than 10 L, has an inner air suction port formed in a lower portion of the inside wall and a discharge hole formed in a lower portion of the inside wall facing the inside wall having the air suction port formed therein.

An air bag having an inner volume of 10 L is mounted to the air bag mounting tube of the sidestream smoke chamber, and a collecting bag having an inner volume of 10 L is mounted to the suction port of the air collecting box. Then, the suction port of the air collecting box is inserted into the through-hole of the sidestream smoke chamber. Further, the discharge port of the air collecting box is connected to the air bag mounting tube of the sidestream smoke chamber by using a hose with a vacuum pump interposed therebetween such that it is possible to suck the air inside the air collecting box and to discharge the sucked air into the air bag mounted inside the chamber, establishing a closed system.

Under the condition described above, a cigarette is mounted to the cigarette mounting tool inside the chamber and is subjected to the static burn so as to generate a sidestream smoke.

After the static burn of the cigarette is completed, the vacuum pump is driven so as to establish a negative pressure inside the air collecting box and at the same time to increase the pressure inside the sidestream smoke chamber by the air discharge into the air bag, thereby allowing the air containing the sidestream smoke within the sidestream smoke chamber to be collected in the collecting bag within the collecting box.

The collecting box is detached from the sidestream smoke chamber under the state that the collecting bag collecting the air containing the sidestream smoke is left housed in the collecting box. Then, the collecting box is connected to a diluting line. The diluting line comprises a line for supplying, by using a pump, a deodorized air into an odor bag having an inner volume of 3 L and connected to its downstream terminal and a branched line branched from the line for supplying the deodorized air so as to be connected to the suction port of the collecting box. Each of these lines is provided with a flow rate control valve. The collecting box is pressurized by a pressurizing pump so as to permit the air within the collecting bag to be supplied into the odor bag through the branched line.

The perfume composition to be evaluated is injected by a syringe into the odor bag thus prepared (diluted to have a concentration equal to that in the case of combusting a single cigarette per 17 m$^3$) and evaporated. The odor bag having the perfume composition injected therein is presented in blind to the panelist together with an odor bag not having a perfume injected therein for the evaluation by a paired comparison test (method of compulsory selection between the two). The result of the evaluation is reported by the panelist in terms of the items given below:

1. Which bag has a stronger intensity of the overall odor?
2. Which bag has a good odor?
3. Which bag has a stronger tobacco odor?

In each of the evaluation items 1 to 3 given above, the number of panelists selecting the odor bag having the perfume composition injected therein was divided by the number of the entire panelists so as to obtain the result of the evaluation. It follows that the smaller number represents the better result in respect of each of the intensity of the overall odor and the intensity of the tobacco odor. On the other hand, the larger number represents the better result in respect of the quality of the odor. Incidentally, optionally extracted adults who had not received an expert training on the tobacco odor were selected as the panelists. Table 3 shows the results of the evaluation.

TABLE 3

| | Perfume Composition | Amount (mg) | Intensity of Overall Odor | Quality of Odor | Intensity of Tobacco Odor | Number of Panelists |
|---|---|---|---|---|---|---|
| Comparative Examples | Orange essential oil | 5.8 | 0.67 | 0.47 | 0.5 | 30 |
| | | 9.6 | 0.67 | 0.47 | 0.57 | 30 |
| | | 15.4 | 0.75 | 0.71 | 0.36 | 28 |
| | | 19.2 | 0.76 | 0.76 | 0.31 | 29 |
| Examples | MOO | 5.8 | 0.5 | 0.47 | 0.59 | 32 |
| | | 9.6 | 0.50 | 0.68 | 0.21 | 28 |
| | | 15.4 | 0.63 | 0.75 | 0.31 | 32 |
| | | 19.2 | 0.83 | 0.72 | 0.31 | 29 |
| | MOO-1-1 | 0.7 | 0.52 | 0.72 | 0.28 | 29 |
| | MOO-2-1 | 0.4 | 0.48 | 0.74 | 0.29 | 31 |
| | MOO-3-1 | 0.4 | 0.47 | 0.73 | 0.27 | 30 |
| | MOO-1-2 | 0.7 | 0.52 | 0.74 | 0.32 | 31 |
| | MOO-2-2 | 0.4 | 0.53 | 0.72 | 0.25 | 32 |
| | MOO-3-2 | 0.4 | 0.50 | 0.79 | 0.25 | 28 |

As apparent from Table 3, the deodorizing composition of the present invention permits more effectively deodorizing the tobacco odor without significantly increasing the intensity of the overall odor even if mixed with the tobacco odor, compared with the Comparative Examples.

EXAMPLE 1

Granular Deodorant (I) A deodorizing composition for a granular deodorant of the composition shown in Table 4 was prepared by using the terpene-removed MOO fraction (MOO-3-1) prepared in Preparation Example 3.

TABLE 4

<Deodorizing Composition for Granular Deodorant>

| Components | Amount (parts by mass) |
|---|---|
| 2-methylundecanal | 30 |
| Benzyl acetate | 200 |
| Eucalyptus oil | 50 |
| Hexyl salicylate | 40 |
| Isobornyl acetate | 400 |
| Linalool | 30 |
| Linalyl acetate | 50 |
| MOO-3-1 | 50 |
| Oakmoss absolute | 30 |
| Isocamphylcyclohexanol | 20 |
| Acetylcedrene | 100 |
| Total | 1000 |

(II) Propylene glycol (B) shown in Table 5 below was added to silica gel (C) shown in Table 5 and slowly stirred. After propylene glycol was absorbed by silica gel and the surface of silica gel was dried, the deodorizing composition (A) shown in Table 5 was added to the silica gel and allowed to be absorbed by the silica gel while slowly stirring the silica gel, thereby obtaining a granular deodorant.

TABLE 5

<Granular deodorant>

| Components | Amount (parts by mass) |
|---|---|
| (A) Deodorizing composition of Ex. 1 | 10 |
| (B) Propylene glycol | 10 |
| (C) Silica gel B-type | 80 |
| Total | 100 |

EXAMPLE 2

Granular Deodorant

Propylene glycol (B) shown in Table 6 below was added to silica gel (C) shown in Table 6 and slowly stirred. After propylene glycol was absorbed by silica gel and the surface of silica gel was dried, the deodorizing composition (A) shown in Table 6 was added to the silica gel and allowed to be absorbed by the silica gel while slowly stirring the silica gel, thereby obtaining a granular deodorant.

TABLE 6

<Granular deodorant>

| Components | Amount (parts by mass) |
|---|---|
| (A) MOO-3-1 | 10 |
| (B) Propylene glycol | 10 |
| (C) Silica gel B-type | 80 |
| Total | 100 |

EXAMPLE 3

Mist Deodorant (I) A deodorizing composition for a mist deodorant, having the composition shown in Table 7 below was prepared by using the terpene-removed MOO fraction (MOO-2-1) obtained in Preparation Example 2.

TABLE 7

<Deodorizing composition for mist deodorant>

| Components | Amount (parts by mass) |
|---|---|
| 1-octen-3-ol | 5 |
| Cineol | 50 |
| Coumarin | 20 |
| Geraniol | 50 |
| Lavandine oil | 250 |
| Revosandol (trade name; manufactured by Takasago Koryo Kogyo K.K.)[1] | 10 |
| Linalool | 150 |
| Linalyl acetate | 100 |
| MOO-2-2 | 70 |
| Ethylene brassylate | 50 |
| Orange oil | 75 |
| Terpineol | 50 |
| Terpinyl acetate | 120 |
| Total | 1000 |

Note:
[1] (e)-(R)-2-ethyl-4-(2,2,3-trimethyl-3-cyclopenten-1-yl)-2-buten-1-ol (II) Four components (A) shown in Table 8 below were mixed and dissolved completely. Then, the resultant solution was added to a purified water having methyl paraben, which is one of the components (B) shown in Table 8, dissolved therein in advance, and the mixture was stirred to dissolve the components, thereby obtaining a mist deodorant.

TABLE 8

<Mist deodorant>

| | Components | Amount (parts by mass) |
|---|---|---|
| (A) | Deodorizing composition of Ex. 3 | 0.5 |
| | Polyoxyethylene cured castor oil (EO 40) | 1.0 |
| | Polyoxyethylene cured castor oil (EO 60) | 0.5 |
| | 95% geraniol denatured alcohol | 2.5 |
| (B) | Methylparaben | 0.1 |
| | Purified water | 95.4 |
| Total | | 100 |

EXAMPLE 4

Mist Deodorant

Four components (A) shown in Table 9 below were mixed and dissolved completely. Then, the resultant solution was added to a purified water having methyl paraben, which is one of the components (B) shown in Table 9, dissolved therein in advance, and the mixture was stirred to dissolve the components, thereby obtaining a mist deodorant.

TABLE 9

<Mist deodorant>

| | Components | Amount (parts by mass) |
|---|---|---|
| (A) | MOO-2-1 | 0.5 |
| | Polyoxyethylene cured castor oil (EO 40) | 1.0 |
| | Polyoxyethylene cured castor oil (EO 60) | 0.5 |
| | 95% geraniol denatured alcohol | 2.5 |
| (B) | Methylparaben | 0.1 |
| | Purified water | 95.4 |
| Total | | 100 |

EXAMPLE 5

Water-Based Deodorant (I) A deodorizing composition for a water-based deodorant having the composition shown in Table 10 below was prepared by using the terpene-removed MOO fraction (MOO-1-1) obtained in Preparation Example 1.

TABLE 10

<Deodorizing composition for water-based deodorant>

| Components | Amount (parts by mass) |
|---|---|
| Nonyl aldehyde | 1 |
| Citronellol | 380 |
| β-damascon | 3 |
| Eugenol | 20 |
| Cis-3-hexen-1-ol | 8 |
| β-ionone | 50 |

TABLE 10-continued

<Deodorizing composition for water-based deodorant>

| Components | Amount (parts by mass) |
| --- | --- |
| Isocyclocitral | 5 |
| MOO-1-1 | 25 |
| Phenylethyl acetate | 120 |
| Phenylethyl alcohol | 205 |
| Rose oxide | 1 |
| Teaspyran | 2 |
| o-tert-butylcyclohexyl acetate | 180 |
| Total | 1000 |

(II) Purified water, propylene glycol and calcium chloride shown in Table 11 below was stirred until uniform. Then, carrageenan, locust bean gum and methyl paraben were added in small proportions while stirring the mixture, followed by heating the mixture to 80° C. while stirring the mixture. When the mixture was converted into a suspension, the heating was stopped so as to cool the suspension. After cooled to about 65° C., the deodorizing composition for the water-based deodorant of Example 1 (I) and polyoxyethylenesorbitan monooleate were added and stirred. Then, the mixture was kept stirred at 55° C. until the mixture formed a suspension, thereby obtaining a water-based gel deodorant having the composition shown in Table 11 below.

TABLE 11

<Water-based gel deodorant>

| Components | Amount (parts by mass) |
| --- | --- |
| Carrageenan | 2.0 |
| Locust bean gum | 0.4 |
| Methylparaben | 0.1 |
| Purified water | 88.6 |
| Calcium chloride | 0.4 |
| Propylene glycol | 3.0 |
| Deodorizing composition of Ex. 5 (I) | 5.0 |
| Polyoxyethylenesorbitan monooleate | 0.5 |
| Total | 100.0 |

EXAMPLE 6

Water-Based Gel Deodorizing Agent

Purified water, propylene glycol and calcium chloride shown in Table 12 below was stirred until uniform. Then, carrageenan, locust bean gum, and methylparaben were added in small proportions while stirring the mixture, followed by heating the mixture to 80° C. while stirring the mixture. When the mixture was converted into a suspension, the heating was stopped so as to cool the suspension. After cooled to about 65° C., the terpene-removed MOO fraction (MOO-1-1) prepared in Preparation Example 1 and polyoxyethylenesorbitan monooleate were added and stirred. Then, the mixture was kept stirred at 55° C. until the mixture formed a suspension, thereby obtaining a water-based gel deodorant having the composition shown in Table 12 below.

TABLE 12

<Water-based gel deodorant>

| Components | Amount (parts by mass) |
| --- | --- |
| Carrageenan | 2.0 |
| Locust bean gum | 0.4 |
| Methylparaben | 0.1 |
| Purified water | 88.6 |
| Calcium chloride | 0.4 |
| Propylene glycol | 3.0 |
| MOO-1-1 5 | 5.0 |
| Polyoxyethylenesorbitan monooleate | 0.5 |
| Total | 100.0 |

EXAMPLE 7

Oily Gel Deodorant (I) A deodorizing composition for an oily gel deodorant having the composition as shown in Table 13 below was prepared by using the terpene-removed MOO fraction (MOO-1-2) prepared in Preparation Example 4:

TABLE 13

<Deodorizing composition for oily gel deodorant>

| Components | Amounts (parts by mass) |
| --- | --- |
| Benzyl acetate | 400 |
| Dihydromyrcenol | 20 |
| Methyl dihydrojasmonate | 150 |
| Indole | 10 |
| Linalyl acetate | 50 |
| Methyl anthranilate | 100 |
| MOO-1-2 | 30 |
| Ethylene brassylate | 10 |
| Hexyl benzoate | 100 |
| Orange oil | 50 |
| Phenylethyl alcohol | 30 |
| o-tert-butylcyclohexyl acetate | 50 |
| Total | 1000 |

(II) The components given in Table 14 below were heated and stirred uniformly at 80 to 85° C., followed by cooling the mixture so as to obtain an oily gel deodorant.

TABLE 14

<Oily gel deodorant>

| Components | Amounts (parts by mass) |
| --- | --- |
| Sodium stearate | 7.5 |
| Purified water | 2.0 |
| Hexylene glycol | 4.0 |
| Dibutyl hydroxy toluene | 0.2 |
| d-limonene | 76.3 |
| Deodorizing composition of Ex. 7 (I) | 10.0 |
| Total | 100.0 |

EXAMPLE 8

Oily Gel Deodorant

The components given in Table 15 below were heated and stirred uniformly at 80 to 85° C., followed by cooling the mixture so as to obtain an oily gel deodorant:

TABLE 15

<Oily gel deodorant>

| Components | Amounts (parts by mass) |
|---|---|
| Sodium stearate | 7.5 |
| Purified water | 2.0 |
| Hexylene glycol | 4.0 |
| Dibutyl hydroxy toluene | 0.2 |
| d-limonene | 76.3 |
| MOO-1-2 | 10.0 |
| Total | 100.0 |

EXAMPLE 9

Aerosol Deodorant (I) A deodorizing composition for an aerosol deodorant having the composition shown in Table 16 given below was prepared by using the terpene-removed MOO fraction (MOO-2-2) prepared in Preparation Example 5:

TABLE 16

<Deodorizing composition for aerosol deodorant>

| Components | Amounts (parts by mass) |
|---|---|
| Benzyl acetate | 50 |
| Benzyl salicylate | 30 |
| Cedryl acetate | 50 |
| Citronellol | 65 |
| Coriandar oil | 30 |
| Lavender oil | 250 |
| MOO-2-2 | 100 |
| Pine needle oil | 150 |
| Rosemary oil | 25 |
| Sage oil | 150 |
| o-tert-butylcyclohexyl acetate | 100 |
| Total | 1000 |

(II) The components (A) shown in Table 17 given below were stirred and dissolved, followed by loading the resultant solution in an aerosol can and subsequently sealing the aerosol can. Then, the component (B) was injected into the aerosol can so as to obtain an aerosol deodorant. A liquefied propane gas, which is generally used in an aerosol deodorant, was used as an aerosol propellant.

TABLE 17

<Aerosol deodorant>

| | Components | Amounts (parts by mass) |
|---|---|---|
| (A) | Deodorizing composition of Ex. 9 (I) | 1.0 |
| | 95% geraniol denatured alcohol | 48.5 |
| | Spherical silica | 0.5 |
| (B) | Aerosol propellant (liquefied propane gas) | 50.0 |
| Total | | 100.0 |

EXAMPLE 10

Aerosol Deodorant

The components (A) shown in Table 18 given below were stirred and dissolved, followed by loading the resultant solution in an aerosol can and subsequently sealing the aerosol can. Then, the component (B) was injected into the aerosol can so as to obtain an aerosol deodorant. A liquefied propane gas, which is generally used in an aerosol deodorant, was used as an aerosol propellant.

TABLE 18

<Aerosol deodorant>

| | Components | Amounts (parts by mass) |
|---|---|---|
| (A) | MOO-2-2 | 1.0 |
| | 95% geraniol denatured alcohol | 48.5 |
| | Spherical silica | 0.5 |
| (B) | Aerosol propellant (liquefied propane gas) | 50.0 |
| Total | | 100.0 |

EXAMPLE 11

Shampoo

A deodorizing composition for shampoo having the composition shown in Table 19 given below was prepared by using the terpene-removed MOO fraction (MOO-3-2) prepared in Preparation Example 6.

TABLE 19

<Deodorizing composition for shampoo>

| Components | Amounts (parts by mass) |
|---|---|
| Dodecanal | 4 |
| Benzyl acetate | 40 |
| α-damascon | 10 |
| Eugenol | 30 |
| Garakusolid (trade name; manufactured by IFF Inc.)[1] | 170 |
| Methyl dihydrojasmonate | 100 |
| Heliobouquete (trade name; manufactured by Takasago Koryo Kogyo K.K.)[2] | 80 |
| Kobanol (trade name, manufactured by Takasago Koryo Kogyo K.K.)[3] | 70 |
| Lemon oil | 150 |
| Levosandole (trade name, manufactured by Takasago Koryo Kogyo K.K.)[4] | 50 |
| p-tert-butyl-α-methylhydrocinnamic aldehyde | 80 |
| MOO-3-2 | 30 |
| Ethylene brassylate | 35 |
| Phenylethyl alcohol | 100 |
| Terpineol | 50 |
| Vanillin | 1 |
| Total | 1000 |

Note:
[1] 1,3,4,6,7,8-hexhydro-4,6,6,7,8,8-hexamehyl-cyclopenta-γ-2-benzopyran
[2] 2-methyl-3-(3,4-methylenedioxyphenyl)-propanal
[3] 4(3)-(4-hydroxy-4-methypentyl)-3-cyclohexene-1-carboxyaldehyde
[4] (E)-(R)-2-ethyl-4-(2,2,3-trimethyl-3-cyclopenten-1-yl)-2-buten-1-ol (II) The components shown in Table 20 given were stirred at 80° C. so as to obtain a suspension, followed by cooling the suspension to 35° C. so as to obtain a shampoo:

TABLE 20

<Shampoo>

| Components | Amounts (parts by mass) |
| --- | --- |
| Sodium laurylsulfate | 40.00 |
| N-coconut oil fatty acyl-N-carboxy-methoxyethyl-N-carboxymethylethylenediamine disodium | 10.00 |
| Coconut oil fatty acid diethanolamide (2) | 2.00 |
| Butylene glycol | 2.00 |
| Citric acid | 0.35 |
| Sodium chloride | 0.10 |
| Methylparaben | 0.20 |
| Propylparaben | 0.10 |
| Tetrasodium edetoate | 0.10 |
| Purified water | 44.65 |
| Deodorizing composition of Ex. 11 (I) | 0.50 |
| Total | 100.00 |

EXAMPLE 12

Shampoo

The components shown in Table 21 given were stirred at 80° C. so as to obtain a suspension, followed by cooling the suspension to 35° C. so as to obtain a shampoo:

TABLE 21

<Shampoo>

| Components | Amounts (parts by mass) |
| --- | --- |
| Sodium laurylsulfate | 40.00 |
| N-coconut oil fatty acyl-N-carboxy-methoxyethyl-N-carboxymethylethylenediamine disodium | 10.00 |
| Coconut oil fatty acid diethanolamide (2) | 2.00 |
| Butylene glycol | 2.00 |
| Citric acid | 0.35 |
| Sodium chloride | 0.10 |
| Methylparaben | 0.20 |
| Propylparaben | 0.10 |
| Tetrasodium edetoate | 0.10 |
| Purified water | 44.65 |
| MOO-3-2 | 0.50 |
| Total | 100.00 |

EXAMPLE 13

Body Shampoo (I) A deodorizing composition for a body shampoo having the composition as shown in Table 22 below was prepared by using the terpene-removed MOO fraction (MOO-3-1) obtained in Preparation Example 3.

TABLE 22

<Deodorizing composition for body shampoo>

| Components | Amounts (parts by mass) |
| --- | --- |
| Dodecanal | 50 |
| Karon (Pheizer, trade name)[1] | 5 |
| Chamomile oil | 2 |

TABLE 22-continued

<Deodorizing composition for body shampoo>

| Components | Amounts (parts by mass) |
| --- | --- |
| Methyl dihydrojasmonate | 100 |
| Heliobouquet (trade name, manufactured by Takasago Koryo Kogyo K.K.)[2] | 80 |
| Linalool | 60 |
| MOO-3-1 | 100 |
| Ethylene brassylate | 95 |
| 10-oxahexadecanoride | 50 |
| Isocamphylcyclohexanol | 50 |
| Tetrahydrolinalool | 58 |
| Tonalid (trade name, manufactured by PFW Inc.)[3] | 120 |
| Towanal (trade name, manufactured by Takasago Koryo Kogyo K.K.)[4] | 10 |
| Tripral (trade name, manufactured by IFF Inc.)[5] | 20 |
| p-tert-butylcyclohexyl acetate | 200 |
| Total | 1000 |

Note:
[1] 7-methyl-3,5-dihydro-2H-benzodioxepin-3-one
[2] 2-methyl-3-(3,4-methylenedioxyphenyl)-propanal
[3] 6-acetyl-1,1,2,4,4,7-hexamethyltetrahydro-naphthalene
[4] 4-(4-methyl-3-pentenyl)-3-cyclohexene-1-carbaldehyde
[5] 2,4-dimethyl-3-cyclohexenylcarboxyaldehyde (II) The components given in Table 23 below were stirred at 80° C. so as to obtain a suspension, followed by cooling the suspension to 35° C. so as to obtain a shampoo.

TABLE 23

<Body shampoo>

| Components | Amounts (parts by mass) |
| --- | --- |
| Dibutylhydroxytoluene | 0.05 |
| Methylparaben | 0.10 |
| Propylparaben | 0.10 |
| Tetrasodium edetoate | 0.10 |
| Potassium chloride | 0.20 |
| Glycerin | 5.00 |
| Coconut oil fatty acid diethanolamide (2) | 3.00 |
| Sodium polyoxyethylenelauryl-ether acetate (3 E.O.) (30%) | 10.00 |
| Coconut oil fatty acid amide propyl betaine | 25.00 |
| Potassium myristate (40%) | 25.00 |
| Purified water | 30.95 |
| Deodorizing composition of Ex. 13 (I) | 0.50 |
| Total | 100.00 |

EXAMPLE 14

Body Shampoo

The components given in Table 24 below were stirred at 80° C. so as to obtain a suspension, followed by cooling the suspension to 35° C. so as to obtain a shampoo.

TABLE 24

<Body shampoo>

| Components | Amounts (parts by mass) |
| --- | --- |
| Dibutylhydroxytoluene | 0.05 |
| Methylparaben | 0.10 |
| Propylparaben | 0.10 |

TABLE 24-continued

<Body shampoo>

| Components | Amounts (parts by mass) |
|---|---|
| Tetrasodium edetoate | 0.10 |
| Potassium chloride | 0.20 |
| Glycerin | 5.00 |
| Coconut oil fatty acid diethanolamide (2) | 3.00 |
| Sodium polyoxyethylenelauryl-ether acetate (3 E.O.) (30%) | 10.00 |
| Coconut oil fatty acid amide propyl betaine | 25.00 |
| Potassium myristate (40%) | 25.00 |
| Purified water | 30.95 |
| MOO-3-1 | 0.50 |
| Total | 100.00 |

EXAMPLE 15

Rinse (I) A deodorizing composition for rinse having the composition shown in Table 25 below was prepared by using the terpene-removed MOO fraction (MOO-2-1) obtained in Preparation Example 2.

TABLE 25

<Deodorizing composition for rinse>

| Components | Amounts (parts by mass) |
|---|---|
| Undecanal | 5 |
| Benzyl acetate | 100 |
| Citronellol | 100 |
| Coumarin | 10 |
| Methyl dihydrojasminate | 240 |
| Heliotropin | 80 |
| Iso yee super (trade name, manufactured by IFF Inc.)[1] | 60 |
| Lemon oil | 55 |
| Levosandole (trade name, manufactured by Takasago Koryo Kogyo K.K.)[2] | 30 |
| MOO-2-1 | 30 |
| Ethylene brassylate | 200 |
| Suzaral (trade name, manufactured by Takasago Koryo Kogyo K.K.)[3] | 10 |
| Vanillin | 10 |
| p-tert-butylcyclohexyl acetate | 80 |
| Total | 1000 |

Note:
[1] 7-acetyl-1,2,3,4,5,6,7,8-octahydro-1,1,6,7-tetramethylnaphthalene
[2] (E)-(R)-2-ethyl-4-(2,2,3-trimethyl-3-cyclopenten-1-yl)-2-buten-1-ol
[3] p-isobutyl-α-methylhydrocinnamic aldehyde (II) A composition having the components shown in Table 26 below was heated uniformly to 80° C. while stirring the composition, followed by cooling the composition to 35° C. so as to obtain a rinse.

TABLE 26

<Rinse>

| Components | Amounts (parts by mass) |
|---|---|
| O-[2-hydroxy-3-(trimethylammonio)-propyl] hydroxyethyl cellulose chloride | 0.10 |
| Sodium hydroxide | 0.03 |
| Citric acid | 0.05 |
| Methylparaben | 0.20 |

TABLE 26-continued

<Rinse>

| Components | Amounts (parts by mass) |
|---|---|
| Propylparaben | 0.10 |
| Polyoxyethylene cetyl ether (10 E.O.) | 0.50 |
| Cetanol | 1.50 |
| Behenyl alcohol | 3.00 |
| Distearyl dimethyl ammonium chloride (90%) | 0.20 |
| Stearyl trimethyl ammonium chloride (50%) | 1.50 |
| Cetyl 2-ethylhexanoate | 0.50 |
| Methyl polysiloxane | 2.00 |
| Deodorizing composition Example 15 (I) | 0.50 |
| Purified water | 89.82 |
| Total | 100.00 |

EXAMPLE 16

Rinse

The components shown in Table 27 below were heated and stirre at 80° C. until uniform, followed by cooling the mixture to 35° C. so as to obtain a rinse.

TABLE 27

<Rinse>

| Components | Amounts (parts by mass) |
|---|---|
| O-[2-hydroxy-3-(trimethylammonio)-propyl] hydroxyethyl cellulose chloride | 0.10 |
| Sodium hydroxide | 0.03 |
| Citric acid | 0.05 |
| Methylparaben | 0.20 |
| Propylparaben | 0.10 |
| Polyoxyethylene cetyl ether (10 E.O.) | 0.50 |
| Cetanol | 1.50 |
| Behenyl alcohol | 3.00 |
| Distearyl dimethyl ammonium chloride (90%) | 0.20 |
| Stearyl trimethyl ammonium chloride (50%) | 1.50 |
| Cetyl 2-ethylhexanoate | 0.50 |
| Methyl polysiloxane | 2.00 |
| MOO-2-1 | 0.50 |
| Purified water | 89.82 |
| Total | 100.00 |

EXAMPLE 17

Yogurt Candy (I) A yogurt flavor of the composition shown in Table 28 below was prepared by using the terpene-removed MOO fraction (MOO-3-1) obtained in Preparation Example 3.

TABLE 28

<Yogurt flavor>

| Components | Amounts (parts by mass) |
|---|---|
| Ethylvanillin | 2.0 |
| Vanillin | 4.0 |
| Lemon oil | 15.0 |
| Orange oil | 38.0 |
| Lemon terpene-less oil | 1.0 |
| MOO-3-1 | 2.0 |

TABLE 28-continued

<Yogurt flavor>

| Components | Amounts (parts by mass) |
|---|---|
| Milk base (manufactured by Takasago Koryo Kogyo K.K.) | 20.0 |
| Ester base (manufactured by Takasago Koryo Kogyo K.K.) | 16.0 |
| Acid base (manufactured by Takasago Koryo Kogyo K.K.) | 2.0 |
| Total | 100.0 |

(II) A yogurt candy having the composition shown in Table 29 below was manufactured by using the yogurt flavor prepared in Example 17 (I).

TABLE 29

<Yogurt candy>

| Components | Amounts (parts by mass) |
|---|---|
| Granulated sugar | 540.0 |
| Thick malt syrup | 480.0 |
| Purified water | 160.0 |
| Vegetable hardened oil | 20.0 |
| Lecithin | 0.2 |
| All fat condensed milk | 50.0 |
| Fermented milk paste | 25.0 |
| Yogurt flavor of Example 17 (I) | 1.0 |

EXAMPLE 18

Mouth Washing Agent

A mouth wash flavor of the composition shown in Table 30 below was prepared by using the terpene-removed MOO fraction (MOO-1-1) obtained in Preparation Example 1:

TABLE 30

<Mouth wash flavor>

| Components | Amounts (parts by mass) |
|---|---|
| 1-menthol | 50.0 |
| Peppermint oil top cut | 20.0 |
| Eucalyptus oil | 10.0 |
| MOO-1-1 | 10.0 |
| Anethole | 6.0 |
| Sage oil | 2.0 |
| Eugenol | 1.0 |
| Fennel oil | 0.8 |
| Thyme oil | 0.2 |
| Total | 100.0 |

(II) A mouth washing agent having the composition shown in Table 31 below was prepared by using the mouth wash flavor prepared in Example 18 (I).

TABLE 31

<Mouth washing agent>

| Components | Amounts (parts by mass) |
|---|---|
| 95% ethyl alcohol | 15.00 |
| 70% sorbitol solution | 10.00 |

TABLE 31-continued

<Mouth washing agent>

| Components | Amounts (parts by mass) |
|---|---|
| Polyoxyethylene hardened castor oil (E O 60) | 2.00 |
| Mouth wash flavor of Example 18 (I) | 0.10 |
| Sodium benzoate | 0.05 |
| Saccharin sodium | 0.02 |
| Purified water | 72.83 |
| Total | 100.00 |

EXAMPLE 19

Dentifrice (I) A tooth paste flavor having the composition shown in Table 32 below was prepared by using the terpene-removed MOO fraction (MOO-3-1) prepared in Preparation Example 3.

TABLE 32

<Tooth paste flavor>

| Components | Amounts (parts by mass) |
|---|---|
| Peppermint oil | 35.0 |
| 1-methol | 25.0 |
| Spearmint oil | 10.0 |
| MOO-3-1 | 10.0 |
| Anethole | 8.0 |
| Sweet orange oil | 5.0 |
| Clove oil | 5.0 |
| Lemon oil | 2.0 |
| Total | 100.0 |

(II) A dentifrice having the composition shown in Table 33 below was manufactured by using the tooth paste flavor prepared in Example 19 (I).

TABLE 33

<Dentifrice>

| Components | Amounts (parts by mass) |
|---|---|
| Calcium hydrogen phosphate (Calcium secondary phosphate) | 50.00 |
| Glycerin | 25.00 |
| Sodium carboxymethylcellulose | 1.50 |
| Sodium laurylsulfate | 1.40 |
| Tooth paste flavor of Example 19 (I) | 1.00 |
| Saccharin sodium | 0.20 |
| Sodium benzoate | 0.05 |
| Purified water | 20.85 |
| Total | 100.00 |

EXAMPLE 20

Stomatic Agent (I) An oral fresh flavor having the composition shown in Table 34 given below was prepared by using the terpene-removed MOO fraction (MOO-2-1) obtained in Preparation Example 2.

TABLE 34

<Oral fresh flavor>

| Components | Amounts (parts by mass) |
| --- | --- |
| 1-menthol | 50.0 |
| Lemon oil cold press | 15.0 |
| Peppermint oil | 10.0 |
| 1,8-cineol | 5.0 |
| Lemon oil | 5.0 |
| MOO-2-1 | 5.0 |
| Ethyl alcohol | 10.0 |
| Total | 100.0 |

(II) A stomatic agent having the composition shown in Table 35 below was manufactured by using the oral fresh flavor prepared in Example 20 (I).

TABLE 35

<Stomatic agent>

| Components | Amounts (parts by mass) |
| --- | --- |
| 95% ethyl alcohol | 50.0 |
| Glycerin | 10.0 |
| Polyoxyethylene hardened castor oil (EO 60) | 2.0 |
| Oral fresh flavor of Example 20 (I) | 1.5 |
| Saccharin sodium | 0.2 |
| Purified water | 36.3 |
| Total | 100.0 |

EXAMPLE 21

Chewing Gum (I) A flavor for a chewing gum having the composition shown in Table 36 given below was prepared by using the terpene-removed MOO fraction (MOO-3-2) obtained in Preparation Example 6.

TABLE 36

<Flavor for chewing gum>

| Components | Amounts (parts by mass) |
| --- | --- |
| MOO-3-2 | 5.0 |
| Peppermint oil | 44.5 |
| Spearmint oil | 10.0 |
| 1-menthol | 5.0 |
| Methyl salicylate | 5.0 |
| Eucalyptus oil | 10.0 |
| Clove oil | 0.5 |
| Total | 100.0 |

(II) A chewing gum having the composition shown in Table 37 below was manufactured by using the flavor for a chewing gum prepared in Example 21 (I).

TABLE 37

<Chewing gum>

| Components | Amounts (parts by mass) |
| --- | --- |
| Gum base | 20 |
| Powdery sugar | 66 |

TABLE 37-continued

<Chewing gum>

| Components | Amounts (parts by mass) |
| --- | --- |
| Thick malt syrup | 13 |
| Flavor for chewing gum of Example 21 (I) | 1 |
| Total | 100 |

EXAMPLE 22

Tablet Candy (I) A flavor for a tablet candy having the composition shown in Table 38 below was prepared by using the terpene-removed MOO fraction (MOO-3-1) obtained in Preparation Example 3.

TABLE 38

<Flavor for table candy>

| Components | Amounts (parts by mass) |
| --- | --- |
| MOO-3-1 | 1 |
| 1-menthol | 17 |
| Peppermint oil | 1 |
| Eucalyptus oil | 1 |
| Gum Arabic | 80 |
| Total | 100 |

(II) A tablet candy having the composition shown in Table 39 below was manufactured by using the flavor for a tablet candy prepared of Example 22 (I).

TABLE 39

<Tablet candy>

| Components | Amounts (parts by mass) |
| --- | --- |
| Sugar | 98 |
| Lubricant, emulsifying agent | 1 |
| Flavor for tablet candy of Example 22 (I) | 1 |
| Total | 100 |

EXAMPLE 23

Flavor for Gelatin Capsule (I) A flavor for a gelatin capsule having the composition shown in Table 40 below was prepared by using the terpene-removed MOO fraction (MOO-3-1) obtained in Preparation Example 3.

TABLE 40

<Flavor for gelatin capsule>

| Components | Amounts (parts by mass) |
| --- | --- |
| Peppermint oil | 55 |
| MOO-3-1 | 5 |
| Middle chain fatty acid triglyceride (MCT) | 40 |
| Total | 100 |

(II) A gelatin capsule base material having the composition shown in Table 41 below was prepared by using the flavor for a gelatin capsule prepared in Example 23 (I).

TABLE 41

<Gelatin capsule base material>

| Components | Amounts (parts by mass) |
|---|---|
| Gelatin | 5.0 |
| Purified water | 94.9 |
| Flavor for gelatin capsule of Ex. 23 (I) | 0.1 |
| Total | 100.0 |

The deodorizing effect in respect of the tobacco sidestream smoke and the usability were evaluated for each of the granular deodorants (Examples 1 and 2), the mist deodorants (Examples 3 and 4), the water-based gel deodorants (Examples 5 and 6), the oily gel deodorants (Examples 7 and 8), the aerosol deodorants (Examples 9 and 10), the shampoos (Examples 11 and 12), the body shampoos (Examples 13 and 14), the rinses prepared (Examples 15 and 16), the yogurt candis (Example 17), the mouth washing agent (Example 18), the dentifrice (Example 19), the stomatic agent (Example 20), the chewing gum (Example 21), the tablet candy (Example 22), and the gelatin capsule base material (Example 23). The deodorizing effect and the usability were found to be satisfactory in all of these Examples.

EXAMPLES 24 TO 30

Each of the perfumes obtained in Preparation Examples 1 to 6 was added by the ordinary perfume-imparting technology to tobacco shreds in the amount shown in Table 42, and the tobacco shreds were wrapped with the same wrapper paper sheet so as to prepare a predetermined number of cigarettes for each of the prepared perfumes. Also prepared were cigarettes to which MOO was added. Likewise, a predetermined number of reference cigarettes were prepared in exactly the same procedure, except that the perfume was not added. Incidentally, also prepared were cigarettes for a Comparative Example, in which an orange essential oil was added to the tobacco shreds.

The sidestream smoke odor was evaluated by a room method described below for each of the cigarettes thus prepared.

<Room Method>

Prepared are two rooms (room A and room B) each having a floor area of 31 m$^2$ and a volume of 85 m$^3$, and each being closed except for a door, through which the evaluators enter or leave the room. With the door closed, five reference cigarettes are subjected to static burn within room A. On the other hand, five cigarettes to be evaluated are subjected to static burn within room B, also with the door closed. The panelists are classified into two groups. All the panelists of one group simultaneously enter room A and, after coming out of room A, enter room B. Then, the panelists coming out of room B report the results in respect of the items given below. On the other hand, all the panelists of the other group simultaneously enter room B and, after coming out of room B, enter room A. Then, the panelists coming out-of room A report the results in respect of the items given below:

1. In which room did the panelists feel a higher intensity of the overall odor?
2. In which room did the panelists feel an improvement in the odor?
3. In which room did the panelists feel a higher intensity of the tobacco odor?

To obtain the results, the number of panelists who answered, "room B", in which the cigarettes for evaluation were subjected to the static burn, was divided by the number of all the panelists in respect of each of the evaluation items 1 to 3 given above. It follows that a smaller number represents a better result for both the intensity of the overall odor and the intensity of the tobacco odor. On the other hand, a larger number represents a better result in respect of the improvement of the odor. Incidentally, the panelists were randomized adults, who had not received training on the tobacco odor. Table 42 shows the results.

TABLE 42

| | Cigarettes | | | Results of Evaluation | | | |
|---|---|---|---|---|---|---|---|
| Ex. No. | Perfume Composition | Perfume Amount (μg) | Added Portion | Intensity of Overall Odor | Improvement of Odor | Intensity of Tobacco Odor | Number of Panelists |
| Comp. Ex. | Orange Essential Oil | 13000 | Shreds | 0.8 | 0.70 | 0.40 | 30 |
| Example 1 | MOO | 13000 | Shreds | 0.46 | 0.71 | 0.25 | 28 |
| Example 2 | MOO-1-1 | 1000 | Shreds | 0.52 | 0.74 | 0.23 | 31 |
| Example 3 | MOO-2-1 | 500 | Shreds | 0.43 | 0.70 | 0.27 | 30 |
| Example 4 | MOO-3-1 | 500 | Shreds | 0.47 | 0.73 | 0.27 | 30 |
| Example 5 | MOO-1-2 | 1000 | Shreds | 0.50 | 0.80 | 0.20 | 30 |
| Example 6 | MOO-2-2 | 500 | Shreds | 0.47 | 0.80 | 0.23 | 31 |
| Example 7 | MOO-3-2 | 500 | Shreds | 0.43 | 0.83 | 0.27 | 30 |

As apparent from the results of evaluation given in Table 42, the cigarettes carrying the sidestream smoke odor reducing agent of the present invention permit improving the odor and lowering the intensity of the tobacco odor without substantially increasing the intensity of the overall odor, compared with the cigarette of the Comparative Example.

What is claimed is:

1. A cigarette consisting of a tobacco rod including a tobacco filler material and a cigarette wrapper paper sheet wrapping an outer circumferential surface of the tobacco filler material, and carrying a sidestream smoke odor reducing agent consisting of a mandarin orange essential oil or a mandarin orange essential oil fraction having its terpene hydrocarbons substantially removed therefrom, wherein said cigarette carries the sidestream smoke odor reducing agent on the cigarette wrapper paper sheet.

2. The cigarette according to claim 1, wherein the sidestream smoke odor reducing agent is the mandarin orange essential oil fraction having its terpene hydrocarbons substantially removed therefrom.

3. A cigarette consisting of:
a tobacco rod including a tobacco filler material and a cigarette wrapper paper sheet wrapping an outer circumferential surface of the tobacco filler material;
a filter plug provided at one end of the tobacco rod; and
a sidestream smoke odor reducing agent consisting of a mandarin orange essential oil or a mandarin orange essential oil fraction having its terpene hydrocarbons substantially removed therefrom;
wherein said cigarette carries the sidestream smoke odor reducing agent on the cigarette wrapper paper sheet.

4. The cigarette according to claim 3, wherein the sidestream smoke odor reducing agent is the mandarin orange essential oil fraction having its terpene hydrocarbon substantially removed therefrom.

* * * * *